United States Patent
Ariantaj et al.

(10) Patent No.: US 11,665,394 B2
(45) Date of Patent: *May 30, 2023

(54) SELECTIVE INTERACTIVITY

(71) Applicant: Comcast Cable Communications, LLC, Philadelphia, PA (US)

(72) Inventors: Steve Ariantaj, San Rafael, CA (US); Igor Shapiro, San Francisco, CA (US); Vilas Veeraraghavan, Mill Valley, CA (US); Stephen Wiebe, Mill Valley, CA (US); Mark Thomas, San Francisco, CA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/170,437

(22) Filed: Jun. 1, 2016

(65) Prior Publication Data

US 2017/0118511 A1   Apr. 27, 2017

Related U.S. Application Data

(63) Continuation of application No. 13/800,579, filed on Mar. 13, 2013, now Pat. No. 9,414,114.

(51) Int. Cl.
*H04N 21/442* (2011.01)
*H04N 21/25* (2011.01)
(Continued)

(52) U.S. Cl.
CPC ..... *H04N 21/44204* (2013.01); *H04N 21/251* (2013.01); *H04N 21/25866* (2013.01);
(Continued)

(58) Field of Classification Search
CPC ....... H04N 21/44204; H04N 21/25866; H04N 21/6582
(Continued)

(56) References Cited

U.S. PATENT DOCUMENTS 4,647,974 A   3/1987  Butler et al.
5,469,206 A   11/1995 Strubbe et al.
(Continued)

FOREIGN PATENT DOCUMENTS

DE   60217091 T2   6/2007
EP   0915621 B1    5/1999
(Continued)

OTHER PUBLICATIONS

Advanced Television Systems Committee, Inc., "ATSC Standard: Programming Metadata Communication Protocol, Revision B," Document A/76B, 52 pages (Jan. 14, 2008).
(Continued)

*Primary Examiner* — Nnenna N Ekpo
(74) *Attorney, Agent, or Firm* — Banner & Witcoff, Ltd.

(57) ABSTRACT

A system may selectively deliver interactive portions of a piece of content, based for example on a recipient user's historical tendency to use interactive portions of prior content. Multiple levels of interactivity may be defined for a given piece of content, such as an advertisement, and different users may receive different levels of interactivity based on how much they use interactive features. Some users may receive no interactive features at all, while others may receive the interactive features, and despite the fact that all of the users' devices may be perfectly capable of processing the interactive features for the user. The omission from transmission may conserve bandwidth and transmission resources.

32 Claims, 6 Drawing Sheets

(51) Int. Cl.
*H04N 21/258* (2011.01)
*H04N 21/658* (2011.01)
*H04N 21/8545* (2011.01)
*H04N 21/4725* (2011.01)
*H04N 21/81* (2011.01)
*H04N 21/2668* (2011.01)

(52) U.S. Cl.
CPC ... *H04N 21/25891* (2013.01); *H04N 21/2668* (2013.01); *H04N 21/44222* (2013.01); *H04N 21/4725* (2013.01); *H04N 21/6582* (2013.01); *H04N 21/8166* (2013.01); *H04N 21/8545* (2013.01)

(58) Field of Classification Search
USPC .......................................................... 725/14
See application file for complete search history.

(56) References Cited

U.S. PATENT DOCUMENTS

| | | |
|---|---|---|
| 5,485,221 A | 1/1996 | Banker et al. |
| 5,563,648 A | 10/1996 | Menand et al. |
| 5,579,057 A | 11/1996 | Banker et al. |
| 5,592,551 A | 1/1997 | Lett et al. |
| 5,600,364 A | 2/1997 | Hendricks et al. |
| 5,631,694 A | 5/1997 | Aggarwal et al. |
| 5,671,377 A | 9/1997 | Bleidt et al. |
| 5,689,799 A | 11/1997 | Dougherty et al. |
| 5,706,434 A | 1/1998 | Kremen et al. |
| 5,708,845 A | 1/1998 | Wistendahl et al. |
| 5,727,159 A | 3/1998 | Kikinis |
| 5,742,680 A | 4/1998 | Wilson |
| 5,774,660 A | 6/1998 | Brendel et al. |
| 5,774,664 A | 6/1998 | Hidary et al. |
| 5,774,666 A | 6/1998 | Portuesi |
| 5,809,242 A | 9/1998 | Shaw et al. |
| 5,818,438 A | 10/1998 | Howe et al. |
| 5,819,269 A | 10/1998 | Uomini |
| 5,826,258 A | 10/1998 | Gupta et al. |
| 5,848,396 A | 12/1998 | Gerace |
| 5,872,588 A | 2/1999 | Aras et al. |
| 5,881,284 A | 3/1999 | Kubo |
| 5,895,477 A | 4/1999 | Orr et al. |
| 5,907,322 A | 5/1999 | Kelly et al. |
| 5,925,595 A | 7/1999 | Seitz et al. |
| 5,929,849 A | 7/1999 | Kikinis |
| 5,937,331 A | 8/1999 | Kalluri et al. |
| 5,961,603 A | 10/1999 | Kunkel et al. |
| 5,969,715 A | 10/1999 | Dougherty et al. |
| 5,982,445 A | 11/1999 | Eyer et al. |
| 5,991,306 A | 11/1999 | Burns et al. |
| 6,002,394 A | 12/1999 | Schein et al. |
| 6,006,256 A | 12/1999 | Zdepski et al. |
| 6,008,836 A | 12/1999 | Bruck et al. |
| 6,014,134 A | 1/2000 | Bell et al. |
| 6,014,502 A | 1/2000 | Moraes |
| 6,018,764 A | 1/2000 | Field et al. |
| 6,018,768 A | 1/2000 | Ullman et al. |
| 6,025,837 A | 2/2000 | Matthews, III et al. |
| 6,029,045 A | 2/2000 | Picco et al. |
| 6,049,333 A | 4/2000 | LaJoie et al. |
| 6,055,566 A | 4/2000 | Kikinis |
| 6,061,056 A | 5/2000 | Menard et al. |
| 6,067,107 A | 5/2000 | Travaille et al. |
| 6,076,734 A | 6/2000 | Dougherty et al. |
| 6,101,510 A | 8/2000 | Stone et al. |
| 6,122,658 A | 9/2000 | Chaddha |
| 6,169,543 B1 | 1/2001 | Wehmeyer |
| 6,177,931 B1 | 1/2001 | Alexander et al. |
| 6,182,072 B1 | 1/2001 | Leak et al. |
| 6,188,398 B1 | 2/2001 | Collins-Rector et al. |
| 6,205,582 B1 | 3/2001 | Hoarty |
| 6,209,130 B1 | 3/2001 | Rector, Jr. et al. |
| 6,219,042 B1 | 4/2001 | Anderson et al. |
| 6,230,319 B1 | 5/2001 | Britt, Jr. et al. |
| 6,233,546 B1 | 5/2001 | Datig |
| 6,233,592 B1 | 5/2001 | Schnelle et al. |
| 6,237,022 B1 | 5/2001 | Bruck et al. |
| 6,240,555 B1 | 5/2001 | Shoff et al. |
| 6,253,238 B1 | 6/2001 | Lauder et al. |
| 6,263,501 B1 | 7/2001 | Schein et al. |
| 6,275,989 B1 | 8/2001 | Broadwin et al. |
| 6,295,058 B1 | 9/2001 | Hsu et al. |
| 6,297,853 B1 | 10/2001 | Sharir et al. |
| 6,301,584 B1 | 10/2001 | Ranger |
| 6,308,206 B1 | 10/2001 | Singh |
| 6,320,621 B1 | 11/2001 | Fu |
| 6,327,574 B1 | 12/2001 | Kramer et al. |
| 6,338,094 B1 | 1/2002 | Scott et al. |
| 6,345,292 B1 | 2/2002 | Daugherty et al. |
| 6,357,042 B2 | 3/2002 | Srinivasan et al. |
| 6,363,525 B1 | 3/2002 | Dougherty et al. |
| 6,373,609 B1 | 4/2002 | Mizrahi |
| 6,415,303 B1 | 7/2002 | Meier et al. |
| 6,421,069 B1 | 7/2002 | Ludtke et al. |
| 6,424,717 B1 | 7/2002 | Pinder et al. |
| 6,430,624 B1 | 8/2002 | Jamtgaard et al. |
| 6,434,747 B1 | 8/2002 | Khoo et al. |
| 6,446,261 B1 | 9/2002 | Rosser |
| 6,457,103 B1 | 9/2002 | Challenger et al. |
| 6,459,427 B1 | 10/2002 | Mao et al. |
| 6,460,180 B1 | 10/2002 | Park et al. |
| 6,471,392 B1 | 10/2002 | Holl et al. |
| 6,473,609 B1 | 10/2002 | Schwartz et al. |
| 6,473,858 B1 | 10/2002 | Shimomura et al. |
| 6,496,981 B1 | 12/2002 | Wistendahl et al. |
| 6,510,557 B1 | 1/2003 | Thrift |
| 6,513,019 B2 | 1/2003 | Lewis |
| 6,513,069 B1 | 1/2003 | Abato et al. |
| 6,513,160 B2 | 1/2003 | Dureau |
| 6,515,349 B2 | 2/2003 | Terashima |
| 6,516,349 B1 | 2/2003 | Lieberman |
| 6,518,950 B1 | 2/2003 | Dougherty et al. |
| 6,530,082 B1 | 3/2003 | Del Sesto et al. |
| 6,536,041 B1 | 3/2003 | Knudson et al. |
| 6,542,593 B1 | 4/2003 | Bowman-Amuah |
| 6,546,488 B2 | 4/2003 | Dillon et al. |
| 6,547,754 B1 | 4/2003 | Evans et al. |
| 6,553,409 B1 | 4/2003 | Zhang et al. |
| 6,564,251 B2 | 5/2003 | Katariya et al. |
| 6,564,263 B1 | 5/2003 | Bergman et al. |
| 6,571,392 B1 | 5/2003 | Zigmond et al. |
| 6,574,793 B1 | 6/2003 | Ngo et al. |
| 6,574,795 B1 | 6/2003 | Carr |
| 6,577,346 B1 | 6/2003 | Perlman |
| 6,584,153 B1 | 6/2003 | Gordon et al. |
| 6,601,103 B1 | 7/2003 | Goldschmidt Iki et al. |
| 6,614,914 B1 | 9/2003 | Rhoads et al. |
| 6,615,408 B1 | 9/2003 | Kaiser et al. |
| 6,637,032 B1 | 10/2003 | Feinleib |
| 6,640,145 B2 | 10/2003 | Hoffberg et al. |
| 6,643,652 B2 | 11/2003 | Helgeson et al. |
| 6,651,218 B1 | 11/2003 | Adler et al. |
| 6,654,754 B1 | 11/2003 | Knauft et al. |
| 6,668,378 B2 | 12/2003 | Leak et al. |
| 6,675,350 B1 | 1/2004 | Abrams et al. |
| 6,676,350 B1 | 1/2004 | McSherry et al. |
| 6,681,393 B1 | 1/2004 | Bauminger et al. |
| 6,698,020 B1 | 2/2004 | Zigmond et al. |
| 6,698,023 B2 | 2/2004 | Levitan |
| 6,718,551 B1 | 4/2004 | Swix et al. |
| 6,725,461 B1 | 4/2004 | Dougherty et al. |
| 6,730,624 B2 | 5/2004 | Motoki et al. |
| 6,735,487 B1 | 5/2004 | Marshall et al. |
| 6,742,043 B1 | 5/2004 | Moussa et al. |
| 6,745,368 B1 | 6/2004 | Boucher et al. |
| 6,750,919 B1 | 6/2004 | Rosser |
| 6,756,997 B1 | 6/2004 | Ward, III et al. |
| 6,757,708 B1 | 6/2004 | Craig et al. |
| 6,779,154 B1 | 8/2004 | Nussbaum et al. |
| 6,785,902 B1 | 8/2004 | Zigmond et al. |
| 6,792,616 B1 | 9/2004 | Jerding et al. |
| 6,792,618 B1 | 9/2004 | Bendinelli et al. |

(56) References Cited

U.S. PATENT DOCUMENTS

| | | |
|---|---|---|
| 6,799,326 B2 | 9/2004 | Boylan, III et al. |
| 6,799,327 B1 | 9/2004 | Reynolds et al. |
| 6,810,526 B1 | 10/2004 | Menard et al. |
| 6,813,372 B2 | 11/2004 | Standridge et al. |
| 6,826,597 B1 | 11/2004 | Lonnroth et al. |
| 6,839,903 B1 | 1/2005 | Shintani et al. |
| 6,847,969 B1 | 1/2005 | Mathai et al. |
| 6,925,595 B1 | 8/2005 | Whitledge et al. |
| 6,934,963 B1 | 8/2005 | Reynolds et al. |
| 6,938,270 B2 | 8/2005 | Blackketter et al. |
| 6,941,474 B2 | 9/2005 | Boies et al. |
| 6,941,574 B1 | 9/2005 | Broadwin et al. |
| 7,028,327 B1 | 4/2006 | Dougherty et al. |
| 7,062,777 B2 | 6/2006 | Alba et al. |
| 7,079,176 B1 | 7/2006 | Freeman et al. |
| 7,080,039 B1 | 7/2006 | Marsh |
| 7,100,183 B2 | 8/2006 | Kunkel et al. |
| 7,103,605 B1 | 9/2006 | Hazi et al. |
| 7,103,904 B1 | 9/2006 | Blackketter et al. |
| 7,143,042 B1 | 11/2006 | Sinai et al. |
| 7,143,428 B1* | 11/2006 | Bruck ............... H04N 5/44543 348/E5.105 |
| 7,168,084 B1 | 1/2007 | Hendricks et al. |
| 7,222,155 B1 | 5/2007 | Gebhardt et al. |
| 7,222,163 B1 | 5/2007 | Girouard et al. |
| 7,287,018 B2 | 10/2007 | Lennon |
| 7,394,816 B1 | 7/2008 | Bill |
| 7,500,188 B1 | 3/2009 | Trapani et al. |
| 7,500,195 B2 | 3/2009 | Sahota et al. |
| 7,512,799 B1 | 3/2009 | Chow et al. |
| 7,530,016 B2 | 5/2009 | Sahota et al. |
| 7,631,326 B2 | 12/2009 | Kaneko |
| 7,631,338 B2 | 12/2009 | Del Sesto et al. |
| 7,634,787 B1 | 12/2009 | Gebhardt et al. |
| 7,650,376 B1 | 1/2010 | Blumenau |
| 7,653,687 B2 | 1/2010 | Reisman |
| 7,653,923 B2 | 1/2010 | Flickinger |
| 7,668,963 B1 | 2/2010 | Miner et al. |
| 7,702,995 B2 | 4/2010 | Sahota et al. |
| 7,783,968 B2 | 8/2010 | Sahota et al. |
| 7,930,631 B2 | 4/2011 | Sahota et al. |
| 7,941,564 B2 | 5/2011 | Gebhardt et al. |
| 7,958,457 B1 | 6/2011 | Brandenberg et al. |
| 8,032,651 B2 | 10/2011 | Miner et al. |
| 8,079,045 B2 | 12/2011 | Krapf et al. |
| 8,196,164 B1 | 6/2012 | Oztaskent et al. |
| 8,296,792 B2 | 10/2012 | Sahota et al. |
| 8,407,744 B2* | 3/2013 | Moon ............. H04N 21/44008 725/136 |
| 8,447,840 B1 | 5/2013 | Fong et al. |
| 8,650,480 B2 | 2/2014 | Sahota et al. |
| 8,667,387 B2 | 3/2014 | Sahota et al. |
| 8,667,530 B2 | 3/2014 | Sahota et al. |
| 8,935,719 B2 | 1/2015 | Sargent |
| 8,973,056 B2 | 3/2015 | Ellis et al. |
| 10,244,203 B1 | 3/2019 | Enigma |
| 2001/0001160 A1 | 5/2001 | Shoff et al. |
| 2001/0003212 A1 | 6/2001 | Marler et al. |
| 2001/0003828 A1 | 6/2001 | Peterson et al. |
| 2001/0011265 A1 | 8/2001 | Cuan et al. |
| 2001/0023436 A1 | 9/2001 | Srinivasan et al. |
| 2001/0027491 A1 | 10/2001 | Terretta et al. |
| 2001/0037500 A1 | 11/2001 | Reynolds et al. |
| 2001/0047298 A1 | 11/2001 | Moore et al. |
| 2001/0047518 A1 | 11/2001 | Sahota et al. |
| 2001/0051031 A1 | 12/2001 | Hada et al. |
| 2001/0054031 A1 | 12/2001 | Lee et al. |
| 2001/0056460 A1 | 12/2001 | Sahota et al. |
| 2002/0010928 A1* | 1/2002 | Sahota ............... H04N 21/812 348/E7.054 |
| 2002/0011265 A1 | 1/2002 | Ganachaud |
| 2002/0042920 A1 | 4/2002 | Thomas et al. |
| 2002/0046237 A1 | 4/2002 | Yokokura |
| 2002/0046273 A1 | 4/2002 | Lahr et al. |
| 2002/0049749 A1 | 4/2002 | Helgeson et al. |
| 2002/0056087 A1 | 5/2002 | Berezowski et al. |
| 2002/0059644 A1 | 5/2002 | Andrade et al. |
| 2002/0075403 A1 | 6/2002 | Barone et al. |
| 2002/0087999 A1 | 7/2002 | Kashima |
| 2002/0104086 A1 | 8/2002 | Tomsen et al. |
| 2002/0112226 A1 | 8/2002 | Brodersen et al. |
| 2002/0112237 A1 | 8/2002 | Kelts |
| 2002/0131511 A1 | 9/2002 | Zenoni |
| 2002/0136448 A1 | 9/2002 | Bortolussi et al. |
| 2002/0138849 A1 | 9/2002 | Blackketter et al. |
| 2002/0184624 A1 | 12/2002 | Spencer |
| 2002/0184627 A1 | 12/2002 | Alba et al. |
| 2003/0018971 A1 | 1/2003 | McKenna |
| 2003/0023971 A1 | 1/2003 | Martinolich et al. |
| 2003/0028873 A1 | 2/2003 | Lemmons |
| 2003/0131311 A1 | 7/2003 | McNamara |
| 2003/0149581 A1 | 8/2003 | Chaudhri et al. |
| 2004/0006747 A1 | 1/2004 | Tyler |
| 2004/0047589 A1 | 3/2004 | Kim |
| 2004/0133910 A1 | 7/2004 | Gordon et al. |
| 2005/0071877 A1 | 3/2005 | Navarro |
| 2005/0108633 A1 | 5/2005 | Sahota et al. |
| 2005/0108634 A1 | 5/2005 | Sahota et al. |
| 2005/0108637 A1 | 5/2005 | Sahota et al. |
| 2005/0114757 A1 | 5/2005 | Sahota et al. |
| 2005/0132420 A1 | 6/2005 | Howard et al. |
| 2005/0149968 A1 | 7/2005 | Konig et al. |
| 2005/0152676 A1 | 7/2005 | Yoo et al. |
| 2005/0193410 A1 | 9/2005 | Eldering |
| 2005/0216932 A1* | 9/2005 | Danker ................. G06Q 30/00 725/32 |
| 2005/0235318 A1 | 10/2005 | Grauch et al. |
| 2006/0064716 A1 | 3/2006 | Sull et al. |
| 2006/0130120 A1 | 6/2006 | Brandyberry et al. |
| 2006/0143655 A1 | 6/2006 | Ellis et al. |
| 2006/0168624 A1 | 7/2006 | Carney et al. |
| 2006/0173560 A1 | 8/2006 | Widrow |
| 2006/0236342 A1* | 10/2006 | Kunkel ............. H04N 5/44543 725/52 |
| 2007/0091919 A1 | 4/2007 | Sandoval |
| 2007/0130581 A1 | 6/2007 | Del Sesto et al. |
| 2007/0136753 A1 | 6/2007 | Bovenschulte et al. |
| 2007/0157249 A1 | 7/2007 | Cordray et al. |
| 2007/0162961 A1 | 7/2007 | Tarrance et al. |
| 2008/0010659 A1 | 1/2008 | Zenith |
| 2008/0098446 A1 | 4/2008 | Seckin et al. |
| 2008/0109843 A1* | 5/2008 | Ullah ................... G06Q 30/02 725/34 |
| 2008/0215428 A1 | 9/2008 | Ramer et al. |
| 2008/0319852 A1* | 12/2008 | Gardner ............... G06Q 30/02 705/14.4 |
| 2009/0031374 A1 | 1/2009 | Choi |
| 2009/0119723 A1 | 5/2009 | Tinsman |
| 2009/0150553 A1 | 6/2009 | Collart et al. |
| 2009/0193456 A1* | 7/2009 | Ahn ..................... H04H 20/10 725/32 |
| 2009/0199114 A1* | 8/2009 | Lewis .................. G06Q 30/02 715/763 |
| 2009/0217329 A1 | 8/2009 | Riedl et al. |
| 2009/0254931 A1 | 10/2009 | Pizzurro et al. |
| 2009/0276323 A1* | 11/2009 | Allen ................ G06Q 30/0603 705/26.1 |
| 2009/0276805 A1 | 11/2009 | Andrews, II et al. |
| 2010/0017597 A1 | 1/2010 | Chandwani |
| 2010/0153831 A1 | 6/2010 | Beaton |
| 2010/0161826 A1 | 6/2010 | Miner et al. |
| 2010/0171741 A1 | 7/2010 | Brill et al. |
| 2010/0174783 A1 | 7/2010 | Zarom |
| 2010/0215340 A1 | 8/2010 | Pettit et al. |
| 2010/0251279 A1 | 9/2010 | Piard et al. |
| 2010/0268773 A1 | 10/2010 | Hunt et al. |
| 2010/0309196 A1* | 12/2010 | Castleman ............. G06T 13/80 345/418 |
| 2010/0332315 A1* | 12/2010 | Kamar ............. G06Q 30/0254 705/14.46 |
| 2010/0333153 A1 | 12/2010 | Sahota et al. |
| 2011/0119478 A1 | 5/2011 | Jackson |
| 2011/0191667 A1 | 8/2011 | Sahota et al. |

(56) References Cited

U.S. PATENT DOCUMENTS

| | | | |
|---|---|---|---|
| 2012/0041825 A1* | 2/2012 | Kasargod | G06Q 30/02 705/14.68 |
| 2012/0084812 A1 | 4/2012 | Thompson et al. | |
| 2012/0117584 A1* | 5/2012 | Gordon | H04N 21/254 725/19 |
| 2012/0189272 A1 | 7/2012 | Kunigita et al. | |
| 2013/0014155 A1 | 1/2013 | Clarke et al. | |
| 2013/0014192 A1 | 1/2013 | Sahota et al. | |
| 2013/0051770 A1 | 2/2013 | Sargent | |
| 2013/0117406 A1 | 5/2013 | Chevillat et al. | |
| 2013/0144725 A1 | 6/2013 | Li et al. | |
| 2013/0173742 A1 | 7/2013 | Thomas et al. | |
| 2013/0179925 A1 | 7/2013 | Woods et al. | |
| 2013/0205343 A1 | 8/2013 | Kirby | |
| 2013/0238445 A1* | 9/2013 | Rao | G06Q 30/0267 705/14.66 |
| 2013/0325603 A1* | 12/2013 | Shamir | G06Q 30/0251 705/14.52 |
| 2013/0347018 A1 | 12/2013 | Limp et al. | |
| 2014/0018033 A1* | 1/2014 | Luna | H04W 72/1257 455/405 |
| 2014/0053223 A1 | 2/2014 | Vorobyov et al. | |
| 2014/0115472 A1 | 4/2014 | Mochinaga et al. | |
| 2014/0130085 A1 | 5/2014 | Sahota et al. | |
| 2014/0181855 A1 | 6/2014 | Fife et al. | |
| 2014/0189500 A1 | 7/2014 | Sahota et al. | |
| 2014/0201769 A1 | 7/2014 | Neumeier et al. | |
| 2014/0282653 A1 | 9/2014 | Ariantaj et al. | |
| 2014/0282735 A1* | 9/2014 | Davis | H04N 21/482 725/48 |
| 2014/0379855 A1 | 12/2014 | Sahota et al. | |
| 2015/0156564 A1 | 6/2015 | Sargent | |
| 2015/0256903 A1 | 9/2015 | Walker | |

FOREIGN PATENT DOCUMENTS

| | | |
|---|---|---|
| EP | 0942595 A2 | 9/1999 |
| EP | 1269750 A1 | 1/2003 |
| EP | 1286541 A1 | 2/2003 |
| EP | 1381961 A1 | 1/2004 |
| EP | 1826981 A1 | 8/2007 |
| EP | 1954054 A1 | 8/2008 |
| WO | 2000078043 A1 | 12/2000 |
| WO | 2001058159 A1 | 8/2001 |
| WO | 01/82614 A1 | 11/2001 |
| WO | 0182613 A1 | 11/2001 |
| WO | 2002086746 A1 | 10/2002 |
| WO | 03017129 A1 | 2/2003 |
| WO | 2005006758 A1 | 1/2005 |

OTHER PUBLICATIONS

Heather Wilner, "Verizon FiOS Brings You the 2012 London Summer Olympic Games," 3 pages, available at <http://forums.verizon.com/t5/Verizon-at-Home/Verizon-FiOS-Brings-You-the-2012-London-Summer-Olympic-Games/ba-p/462267> (Jul. 23, 2012, accessed Mar. 5, 2014).

Extended European Search Report—EP 14159424.2—dated May 13, 2014.

Extended European Search Report—EP Appl. 15158005.7—dated Jul. 29, 2015.

"Spyglass Prism: Concepts and Applications", Spyglass Inc, 1997, pp. 1-8.

Puder, A., et al, "Position Papers: System Support for Knowledge-Based Trading in Open Service Markets", Proceedings of the 7th Workshop on ACM SIGOPS European Workshop: Systems Support for Worldwide Applications, Sep. 1996, pp. 289-296.

Ensink, Brian, et al., "XML Based Adaptation of the Composite Approach for Database Integration", Proceedings of the 37th Annual Southeast Regional Conference (CD-ROM), Apr. 1999, pp. 1-6.

Arens, Yigal, et al, "Intelligent Caching: Selecting, Representing, and Reusing Data in an Information Server", Proceedings of the Third International Conference on Information and Knowledge Management, Nov. 1994, pp. 433-438.

Spencer, Ken, "Using XML to Build Internet Solutions", Windows IT Pro, http://www.winntmag.com/Articles/Print.cfm?ArticleiD=5056, Apr. 1999.

Bayardo, R J., et al., "InfoSieuth: Agent-Based Semantic Integration of Information in Open and Dynamic Environments", ACM SIGMOD Record, (Jun. 1997), vol. 26, Issue 2, pp. 195-206.

Calvary, Gaelle, et al., "From Single-User Architectural Design to PAC': a Generic Software Architecture Model for CSCW", Proceedings of the SIGCHI Conference on Human Factors in Computing Systems, (Mar. 1997), pp. 342-349.

Wegner, Lutz, et al, "Applications: A Visual Interface for Synchronous Collaboration and Negotiated Transactions", Proceedings of the Workshop on Advanced Visual Interfaces, May 1996, pp. 156-165.

Bulterman, Dick C., "Embedded Video in Hypermedia Documents: Supporting Integration and Adaptive Control", ACM Transactions on Information Systems (TOIS), vol. 13, Issue 4, Oct. 1995, pp. 440-470.

Hijiri, Toshiki, et al, "A Spatial Hierarchical Compression Method for 3D Streaming Animation", Proceedings of the Fifth Symposium on Virtual Reality Modeling Language (Web3D-VRML), Feb. 2000, pp. 95-101.

Glushko, Robert J., et al, "An XML Framework for Agent-Based E-Commerce", Communications of the ACM, vol. 42, No. 3, Mar. 1999, pp. 106-114.

Claypool, Kajal, et al., "OQL_SERF: An ODMG Implementation of the Template-Based Schema Evolution Framework", Proceedings of the 1998 Conference of the Centre for Advanced Studies on Collaborative Research, (Nov. 1998), pp. 1-15.

Fraisse. S, et al., "Generating Hypermedia Form Specifications by Sketching Multimedia Templates", ACM, (1996), pp. 353-363.

Iyengar, Arun, et al., "Improving Web Server Performance by Caching Dynamic Data", proceedings of the US EN IX Symposium on Internet Technologies and Systems, (Dec. 1997), pp. 1-13.

Puerta, Angel, et al., "Towards a General Computational Framework for Model-Based Interface Development", Proceedings of the 4th International Conference on Intelligent User Interfaces, (Dec. 1998), pp. 171-178.

Shim, Simons., et al., "Template Based Synchronized Multimedia Integration Language Authoring Tool", SPIE Conference on Internet Imaging, (Dec. 1999), vol. 3964, pp. 134-142.

"XHTML 1.0: The Extensible HyperText Markup Language, A Reformulation of HTML 4.0 in XML 1.0", www.w3.org, downloaded from http://www.w3.org?TR/19991WD-html-in-xml-199902241, Feb. 24, 1999, pp. 1-15.

Barta, Robert, et al, "Syndication with JML", Proceedings of the 2000 ACM Symposium on Applied Computing—vol. 2, ACM Press, Mar. 2000, pp. 962-970.

Kuchling, Andrew, "XML, the eXtensible Markup Language", Linux Journal, Specialized Systems Consultants, Inc., Nov. 1998, pp. 1-3.

Microsoft Computer Dictionary, Third Edition, Microsoft Press, 1997. p. 505.

Smith, John R., et al. "Scalable Multimedia Delivery for Pervasive Computing", Proceedings of the Seventh ACM International Conference on Multimedia (Part 1), Oct. 1999, pp. 131-140.

Microsoft Computer Dictionary, Third Edition, Microsoft Press, 1997, p. 368.

International Preliminary Examination Report, PCT/US01/13244, dated Feb. 18, 2003 (11 pages).

"Advanced Television Enhancement Forum Specification (ATVEF)", ATVEF, 34 pages, Feb. 2, 1999.

Palmer, Jonathan W., et al, "Digital Newspapers Explore Marketing on the Internet", Communications of the ACM, vol. 42, Issue 9, Sep. 1999, pp. 32-40.

Hodes, Todd D., et al, "Composable Ad Hoc Location-Based Services for Heterogeneous Mobile Clients", Wireless Networks, vol. 5, Issue 5, Oct. 1999, pp. 411-427.

International Search Report for International Application No. PCTIUS01/13244 (Metatv, Inc.), dated Sep. 10, 2001.

(56) References Cited

OTHER PUBLICATIONS

International Search Report for International Application No. PCT/US01/13243 (Metatv, Inc.) dated Oct. 10, 2001.
Morris S: "The MHP Tutorial", Internet Citation, 2002, XP002281053, retrieved from the Internet: URL: http://www.mhp-interactive.org/tutorials/mhp/printerfriendly/ (retrieved on May 19, 2004).
Extended European Search Report—EP12181319—dated Dec. 19, 2012.
Steinhorn, Jason and Mark Kohler, "Enhancing TV With ATVEF" Embedded Systems Programming, Oct. 1999, pp. 55-64.
International Search Report for International Application No. PCT/US01/13241 (Metatv, Inc ), dated Sep. 10, 2001.
European Office Action—EP App 14159424.2—dated Sep. 27, 2016.
May 14, 2018—Canadian Office Action—CA 2,787,562.
Oct. 30, 2018—European Summons to Oral Proceedings—EP 14159424.2.
Feb. 8, 2019—Canadian Office Action—2,787,562.
Sep. 17, 2018—European Office Action—EP 15158005.7.
Oct. 8, 2019—Canadian Office Action—CA 2,787,562.
Apr. 9, 2020—Canadian Office Action—CA 2,845,906.
Sep. 15, 2022—CA Office Action—CA App. No. 3,122,230.
Mar. 16, 2020—European Office Action—EP 15158005.7.
May 25, 2020—Canadian Office Action—CA 2,787,562.
Apr. 9, 2021—Canadian Office Action—CA 2,882,503.
Feb. 11, 2022—Canadian Office Action—CA 2,882,503.

\* cited by examiner

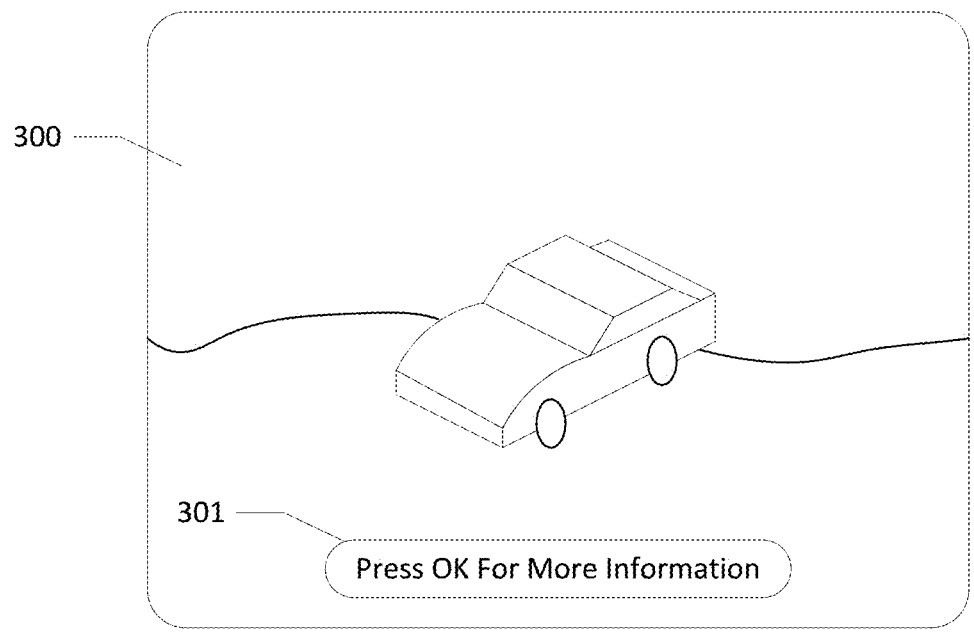
Fig. 3a
Fig. 3b
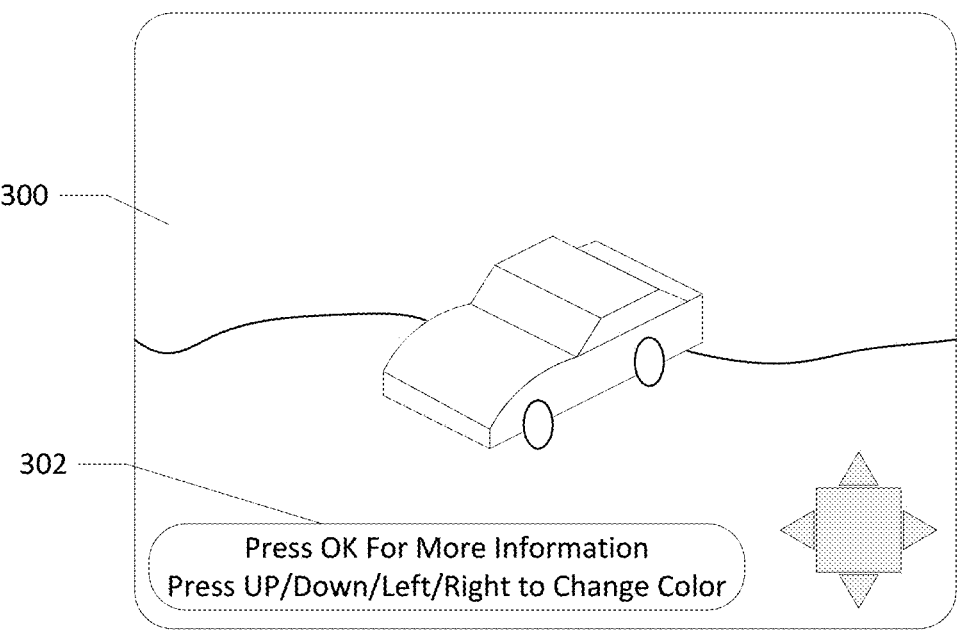

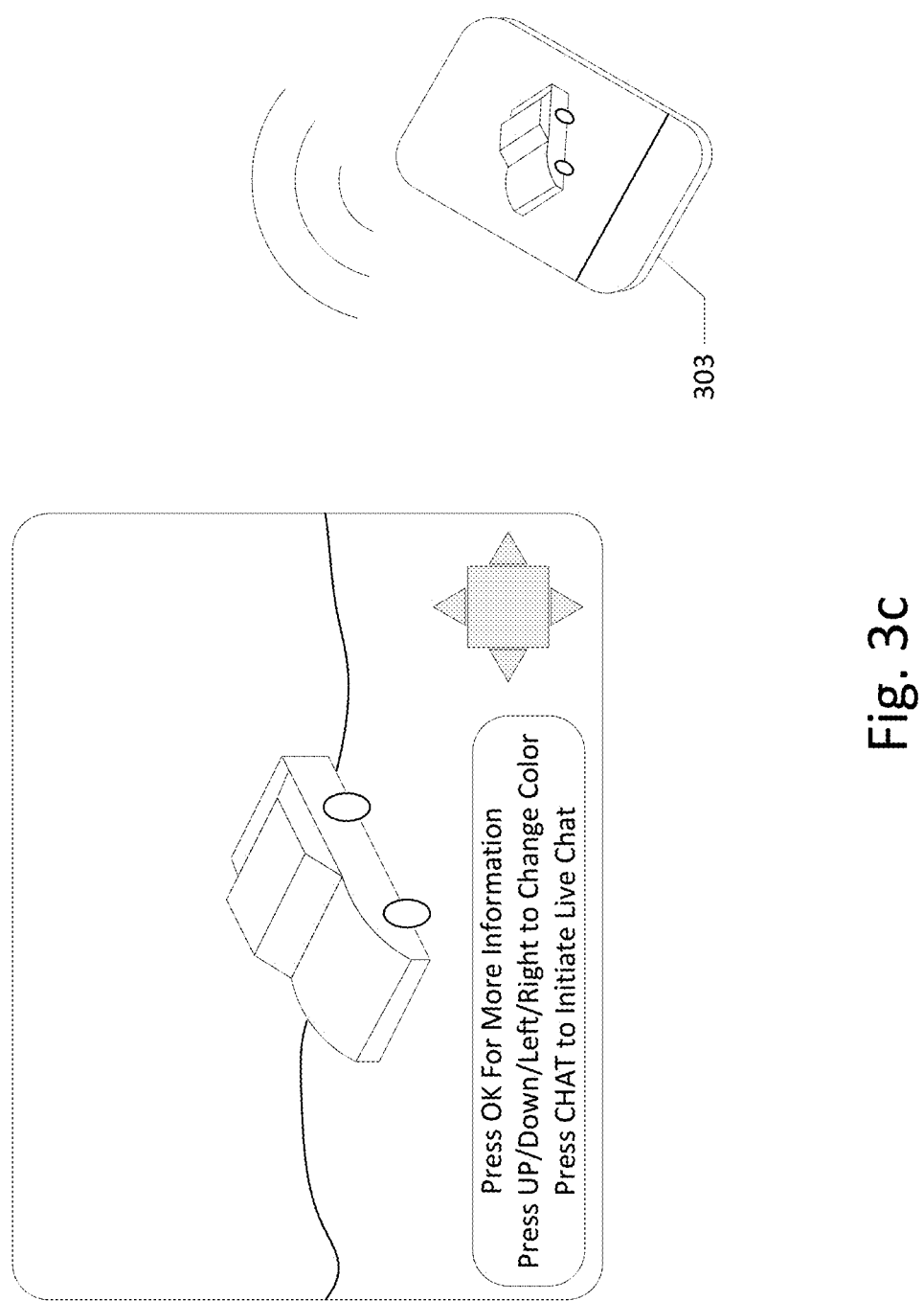

SELECTIVE INTERACTIVITY

CROSS-REFERENCE TO RELATED APPLICATIONS

This application is a continuation of U.S. application Ser. No. 13/800,579, filed Mar. 13, 2013, which is hereby incorporated by reference in its entirety.

BACKGROUND

The growing sophistication among users and their content consumption devices, such as their digital video recorders (DVRs), tablet computers, etc. has led to an increased availability of interactive options when consuming content. Watching a television program may include interactive options to respond to the program. These options consume bandwidth and transmission resources, however, and there remains an ever-present need to more efficiently use available resources.

SUMMARY

The following summary is for illustrative purposes only, and is not intended to limit or constrain the detailed description.

Some of the features described herein may allow a content provider, a data services provider, a network operator, or the like, to selectively avoid delivering interactive content, or an interactive portion of a piece of content; to users who are not likely to actually use the interactive content. For example, if a television commercial includes an interactive option allowing a user to request more information about an advertised product, that option might be delivered to a first user who often or regularly responds to such options, but the option might not be delivered to a second user who seldom or never responds to such options. Even if the second user's devices have the processing resources needed to offer the interactive option, network resources that would otherwise be consumed by delivering unwanted or unlikely to be used interactive data or components, would be saved.

In some embodiments, one or more computing devices may monitor a user's historical level of usage of interactive features that accompany or are included in content consumed by the user. The user's historical level of usage of interactive features may be monitored and stored or learned to determine a level of interactivity. Such levels, alone or together with other data, may be used to deliver content, such as different content, to the user. Different levels of interactivity may be defined for a piece of content, such as one with no interactivity, and another with one or varying levels of interactivity, such as an option to receive additional information, to manipulate a graphical object displayed in the content, etc.

In some embodiments, a one or more computing devices may store or otherwise have access to, information identifying one or more conditions for a user to receive interactive features, and for each of a plurality of interactive features, conditions for varying levels of interactivity. The conditions may identify a frequency with which a user historically accesses interactive content, or a frequency with which a user historically uses a preidentified interface or random option with interactive content.

In some embodiments, it may determined that two sequential pieces of content have interactive options, and that the user is engaged with an interactive option for a first one of the sequential pieces of content. In response, interactive features of the second one of the pieces of sequential content may not be transmitted to the user, or removed from the second content before the second content is sent to the user.

Some embodiments may involve identifying a plurality of interactive features available for a piece of content (e.g., video content), delivering the video content to a plurality of user devices, and selectively delivering some or all of the interactive features to the plurality of user devices, e.g., based on corresponding or particular users' historical patterns of using interactive features. One disclosed implementation may also select interactive features for a user based on a frequency with which the user has previously engaged in interactive features, and/or based on what type of features were engaged. The implementation may identify one or more user interface options for a first one of the interactive features, and determine a frequency with which the user has previously engaged in interactive features using the identified one or more user interface options. It may also identify one or more user consumption devices for a user, and determine a frequency with which the user has previously engaged in interactive features using the identified one or more user consumption devices. In some embodiments, the determination of whether to send an interactive feature to a user may be made based on the type of interactive features that the user uses, without requiring any particular frequency of use. For example, if the user uses reacts to interactive features that are games, but not to features that merely provide additional information about an advertised product, then the system may withhold the unused interactive feature type from future advertisements that are sent to the user.

The summary here is not an exhaustive listing of the novel features described herein, and are not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

FIGS. 3a-c illustrate example screen displays for different levels of interactivity.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Various features described herein allow for the conservation of transmission resources, such as bandwidth, when delivering information (e.g., software, data, etc.) for interactive experiences that accompany a primary presentation of information. For example, some video advertisements may include interactive features that the user can use to engage with the ad. In some embodiments, these features may be withheld from certain users who are deemed to be unlikely to actually take advantage of the interactive features. Withholding the delivery of those interactive features to those users may help conserve data transmission bandwidth and processing.

Figure 1:
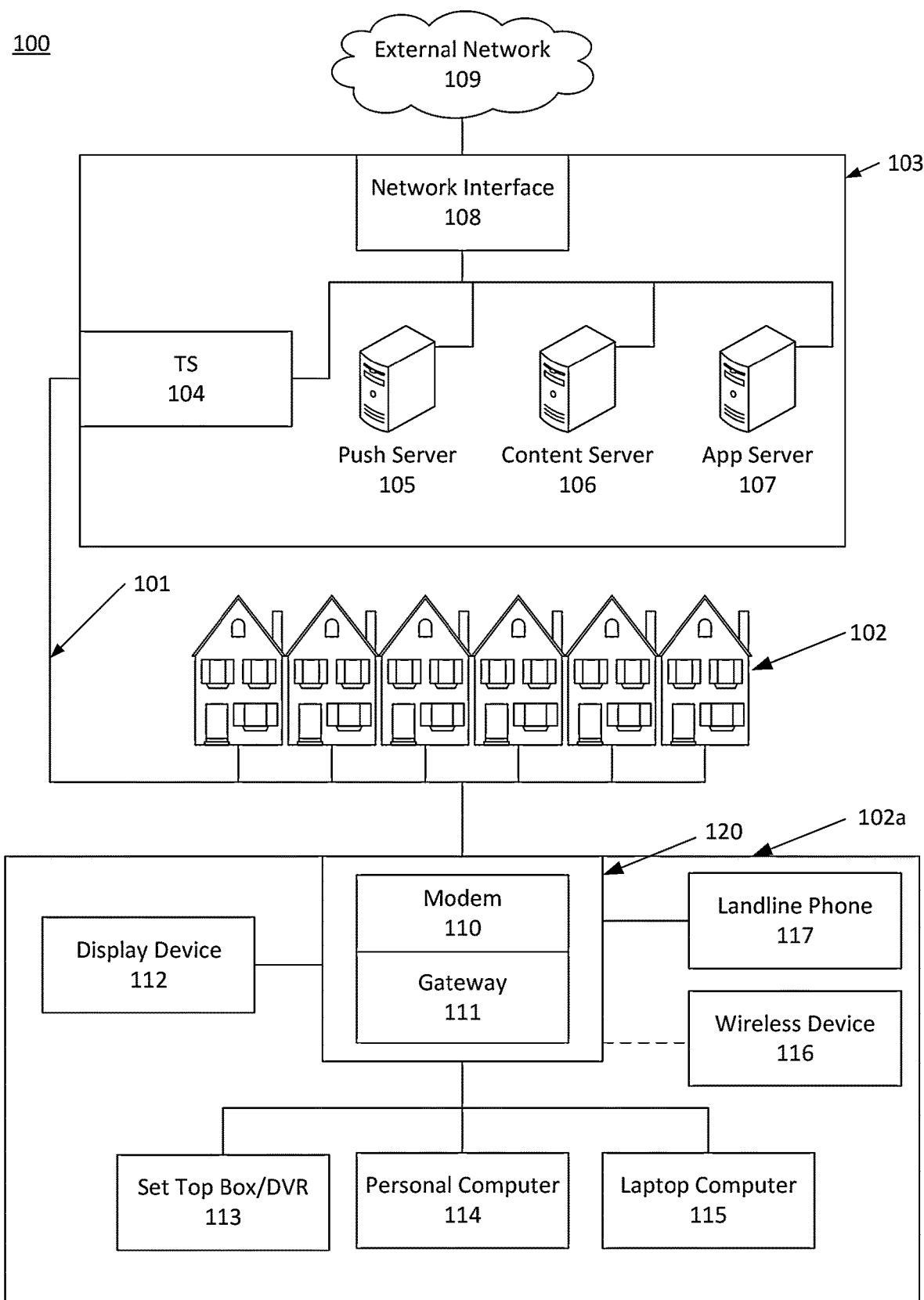
FIG. 1 illustrates an example communication network on which various features described herein may be used.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths. By running fiber optic cable along some portions, for example, signal degradation may be significantly minimized, allowing a single local office 103 to reach even farther with its network of links 101 than before.

The local office 103 may include an interface, such as a termination system (TS) 104. More specifically, the interface 104 may be a cable modem termination system (CMTS), which may be one or more computing devices configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be one or more computing devices configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be one or more computing devices that communicates with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
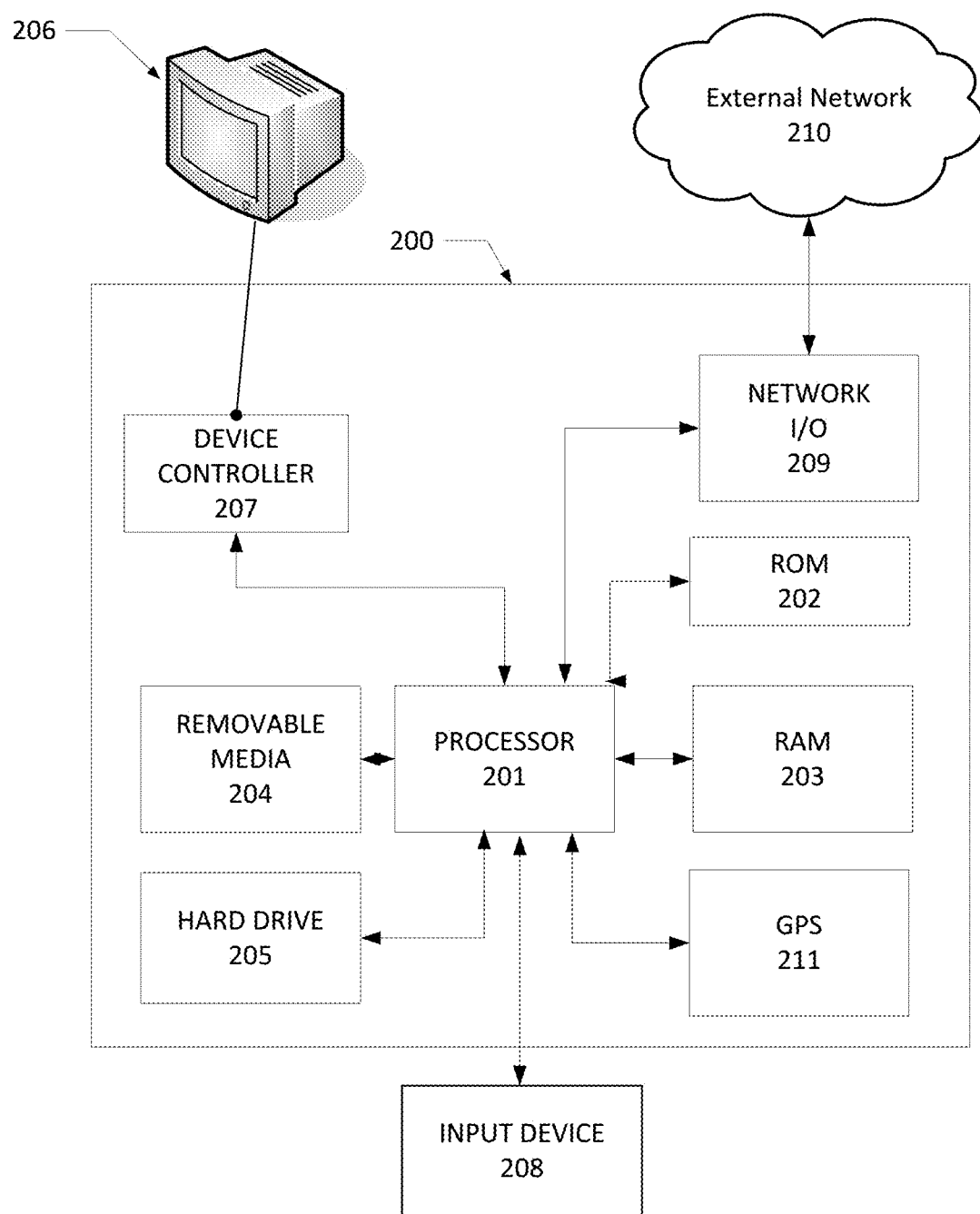
FIG. 2 illustrates an example computing device that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, camera input for user gestures, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

The FIG. 2 example is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

FIGS. 3a-c illustrate examples of interactive features that can accompany a primary video presentation. In FIG. 3a, a primary video presentation 300 may display a scene to a user of a video device, such as a tablet computing device, smart phone, television, computer monitor, or any other desired device that can be used to present video content to a user. The scene may be a video program that the user has requested to view, such as a video on demand (VOD) offering, a movie, a television program, a streaming Internet video, an advertisement within a video program (e.g., a commercial appearing in a multicast presentation of a television program), or any other desired form of video content. The video content described herein may include an audio portion as well.

An interactive feature may accompany the primary video presentation. In the FIG. 3a example, a pop-up message 301 may appear, inviting the user to press a button on an associated remote control (e.g., a DVR remote, a computer keyboard, etc.) to request more information about a displayed product. For example, the pop-up message 301 may invite the user to press an 'OK' button on a remote control, and in response to doing so, the providers of the primary video 300 may arrange to have additional related information sent to the requesting user. In the illustrated example, the requesting user might receive additional information regarding an automobile being advertised in the main video 300.

Pressing the 'OK' button to request more information is one example of an interactive function accompanying the main video 300. Supporting this interactivity may involve transmitting additional content for the feature, such as a command to cause the user's display device to present the pop-up 301, the textual message in the pop-up 301, and one or more instructions to be executed if the user presses the 'OK' button while the pop-up 301 is displayed. This additional information may be sent as part of a video stream delivering the main video 300, or in a separate stream that is transmitted apart from the main video's stream (e.g., in a separate concurrent stream, or delivered in advance, etc.). For example, an MPEG (Moving Picture Experts Group)

stream may use an elementary stream (MPEG ES) to carry software and/or data to provide an interactive experience in conjunction with the main video stream.

The FIG. 3a example showed a relatively simple form of interactivity. FIG. 3b illustrates an example of a more complicated form of interactivity. In the FIG. 3b example, the viewer may be presented with an interactive feature 302 to press a direction on a corresponding control (e.g., directional keypad on a remote control, keyboard, tablet, etc.) to change the color of an automobile shown in the main video 300. This form of interactivity may require more data to support. For example, software instructions may need to be provided to identify the portion(s) of the screen that are to change color (e.g., identifying the car as an object in the screen), identify the available colors and responses to the button press, in addition to the messaging and pop-up data discussed above for the FIG. 3a example. The additional, or alternative, data needed to offer the interactive feature 302 may be sent in the same types of additional streams (e.g., the MPEG ES, or other related stream) discussed above in the FIG. 3a example, but would require a larger amount of bandwidth and processing to handle.

FIG. 3c illustrates yet another, even more sophisticated, form of interactive option. In FIG. 3c, the viewer may be presented with the same color-changing option from FIG. 3b, but may also be presented with an option to press a 'CHAT' button (e.g., on a remote control, keyboard, etc.) to initiate a live chat with a sales representative who may answer questions regarding the automobile being advertised in the main video 300. To avoid interrupting the presentation of the main video 300, the chat function can be carried out on a different device, such as a user's tablet computing device 303. Other forms of interaction involving a second device, different from the one showing the main video 300, may involve interactive Internet pages to research a product being advertised, a virtual tour of an interior of the automobile, viewing time-synchronized content to obtain additional details regarding the main video 300 program, participating in second-screen games synchronized to the main video 300 program, and any other desired form of interactivity involving a second device.

Supporting this more sophisticated interactive option may require transmission of even more data than used in the FIG. 3b experience. The secondary stream may need to carry instructions for coordinating communications with the tablet 303, identifying the viewer's table 303 (e.g., as distinguished from other devices that the user may own, such as a smartphone, or other computing device), communicating with a chat server for the automobile advertiser, etc. Features herein may help reduce the amount of interactivity data that is needed to be transmitted, and FIG. 4 illustrates an example process for accomplishing this.

Figure 4:
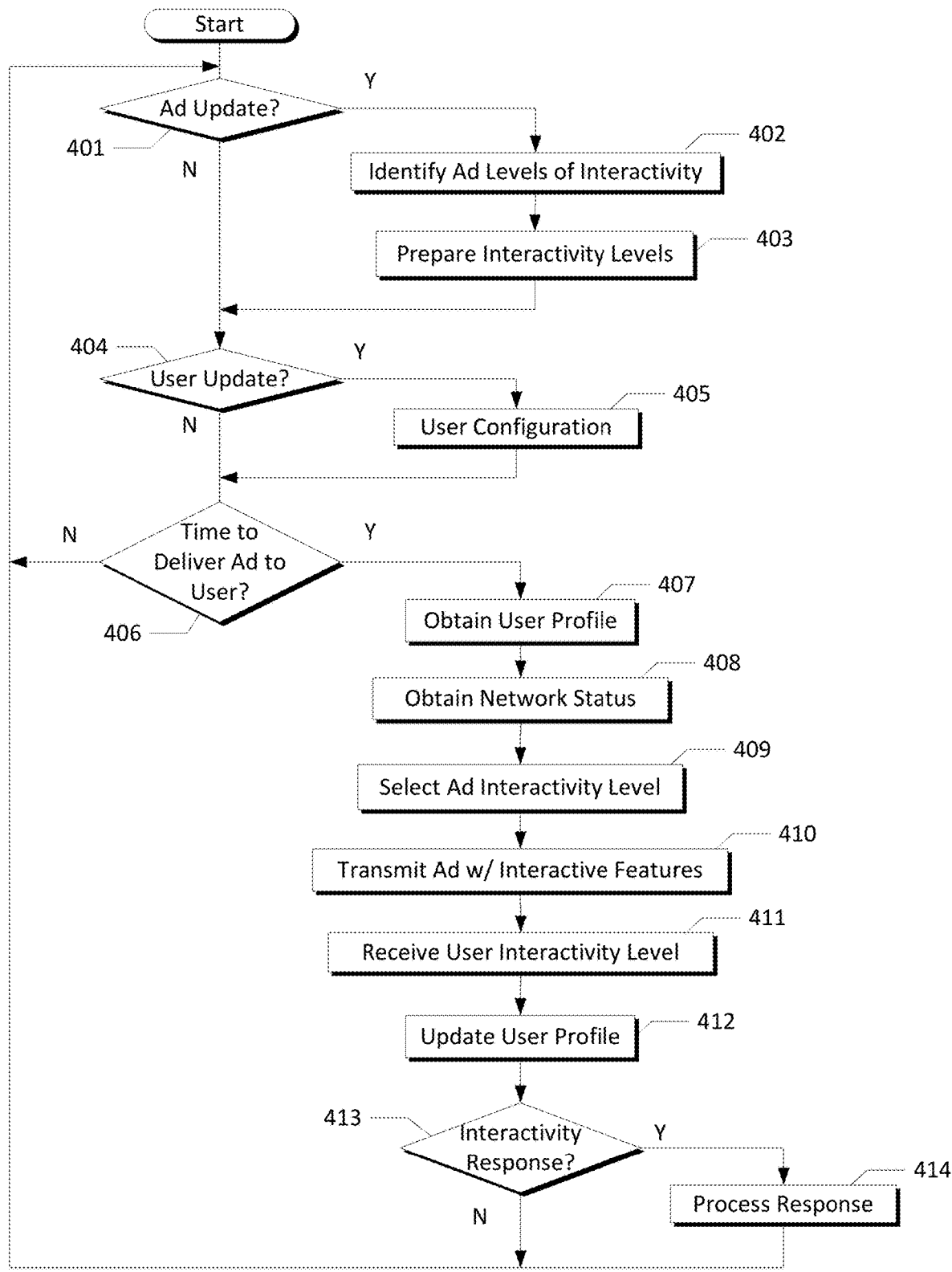
FIG. 4 illustrates an example process flow for implementing various features described herein.

FIG. 4 illustrates an example process that may be performed in accordance with one aspect. The process may be implemented in a network environment having devices such as an application server 107, a user's consumption or access device (e.g., display device 112, gateway 111, personal computer 114, wireless device 116, etc.), or any other desired computing device. The FIG. 4 process is discussed below, for illustration only, using interactive advertising as an example, but the process can be used for any form of data transmission where interactive features may be offered or available. For example, the process may be used for interactive video programs, video games, audio programs, audio games, web pages, user interfaces, electronic messages, and any other desired form of content.

In step 401, a computing device such as an application server 107 may determine whether an advertisement update is desired. In general, an update may be desired whenever a new advertisement is added to the application server for eventual delivery to users (e.g., when an advertiser provides its new commercial to a service provider), or when an existing advertisement is modified (e.g., the advertiser may decide to remove an interactive contest option because the contest has ended). This determination may be made proactively or in response to consideration of a variety of factors. For example, a system administrator may decide to upload a new commercial that has been received from a sponsor, e.g., of a television program; or a service provider may decide to insert a new local commercial into a national transmission, e.g., a multicast feed. Updates may also entail modifying existing advertisements. For example, a sponsor may decide to cut a 30-second commercial down to only 15 seconds. Or the sponsor may wish to change (or remove, or add) the interactive features that accompany an existing commercial. For example, the sponsor may decide to place additional restrictions on a promotional contest (e.g., reducing a coupon's value, raising eligibility requirements, etc.), if initial response to the promotion has exceeded expectations.

If an advertisement update is needed or desired, then in step 402, one or more computing device may identify one or more levels of interactivity for the new or updated advertisement. This identification may be made by a user (e.g., a system administrator using an interface indicating levels of interactivity), or it can be performed automatically (e.g., a computing device such as an advertising server 107 may retrieve an indicated advertisement, and the additional interactivity may be transmitted with the ad). The levels may vary depending on the content, and the FIGS. 3a-c illustrate one example of how a single piece of content (e.g., an automobile advertisement) can have multiple levels of interactivity.

In step 403, one or more computing devices may prepare the different levels of interactivity for delivery to users. This preparation may entail retrieving the software and data associated with each level of interactivity, and processing the software and data for transmission on any delivery networks (e.g., network 101) to be used to deliver the interactive content to users. For example, separate MPEG elementary streams may be prepared for each level of interactivity, and information may be stored to indicate which stream corresponds to which level of interactivity. In some embodiments, this preparation of interactivity levels may involve first determining whether any users are expected to want the interactivity. For example, it may be possible that in an entire neighborhood serviced by an advertising server 107, no households have ever engaged in a type of interactivity that can be offered with an advertisement (e.g., an automobile commercial that includes an interactive option to initiate a video chat session with a local dealer representative). In such a situation, the advertising server 107 may determine that step 403 may be skipped.

One or more computing devices may also store conditional information applicable to the different levels of interactivity. The conditional information may identify one or more prerequisites, preferences, or conditions that may help determine whether a particular interactive feature is to be delivered to a particular user. One condition may be based on the user's consumption device for the main content, such as main video 300. For example, the FIG. 3b interactivity level may only be applicable if the user is using a DVR to view the content (e.g., if the software used to change the color of the automobile is written to run on the DVR's processor), or if the user is using a device that supports the software language in which the color-changing feature is written.

Another condition may involve other devices besides the one used for the main content. For example, the FIG. 3c interactive chat feature may require the presence of the second computing device 303. For this level of interactive service, the computing device may store information indicating that the service should only be provided to users who have a registered secondary device 303 that supports that feature. This condition may also require certain types of networks or connection qualities, and/or availability of certain interface options on the user's main and/or secondary device. For example, availability of directional buttons, accelerometers, gyroscopes, cameras, and other features may be a condition for using certain interactive features (e.g., one feature may involve the user tilting the second device 303 to see different views of the automobile, and that feature would only be of use to users whose devices have an accelerometer/gyroscope).

Another condition may involve the user's previous history of using interactive features. For example, a service provider or any party may store information indicating that the highest level of interactivity should only be delivered to users who regularly interact with interactive feature. Using the FIGS. 3a-c examples, the service provider may determine that the FIG. 3c level of interactivity should only be delivered to users who use 80% or more of offered interactivity, and that the FIG. 3b level of interactivity should only be delivered to users who use between 30% and 79% of offered interactivity, and that users who use 29% or less of offered interactivity should only be presented with the FIG. 3a level of interactivity. These requirement levels described herein may indicate a probability that the user will use the corresponding type of interactivity (e.g., the user is 30% likely to hit the 'ok' button on a pop-up). The conditions may also indicate a frequency with which the user uses specific devices and/or interface options and/or the types of interactive options used (e.g., options for additional information, sports or movies genres, shopping, commerce, education, travel, etc.). For example, one level of interactivity may be limited to those users who use their accelerometers a minimum of 60% of the time that interactive features involving accelerometers are presented to the user (e.g., a commercial may invite users who are viewing the commercial on a tablet having an accelerometer to rotate their tablet and see alternative views of an advertised product, such as an automobile).

Another condition may involve the current state of the data delivery network 101, and the available bandwidth. For example, the service provider may establish network conditions that must be met before a particular level of interactive service is delivered to a user. For example, the highest level of interactive service may require the greatest amount of data traffic, and the service provider may establish a condition that prohibits delivery of the highest level if the available bandwidth falls below a predetermined amount (e.g., 20%). The service provider may, for example, adjust the percentages in the previous condition upwards or downwards in response to changing network conditions and available bandwidth. If bandwidth availability is low, then the service provider could increase the 80% threshold for the highest level of interactivity to a higher value, such as 90%. Raising this threshold may reduce the amount of traffic needed to deliver interactive experiences, to accommodate the lowered amount of available bandwidth.

Another condition may include a time-based restriction on a number of interactive features that can be offered to the user. Some content providers may wish to limit the number of interactive features, to potentially help avoid overloading users, and to keep interactive features new and interesting for users. Such a condition may, for example, indicate that a user should be given no more than one interactive feature offering per hour of programming consumed.

The computing device may also store combinations of any of the conditions described above. For example, a condition may be a combination of a network condition and device condition (e.g., allow interactivity on the user's tablet, when the user is viewing content on the DVR, only if available bandwidth to the user exceeds 30% of available capacity to the user).

In step 404, the computing device may determine, for one or more users, who may in a group, region, or associated with a particular distribution device or network, whether a user update is desired. A user update may be desired when there is a change in a user's account or profile information. For example, if a new user registers for a content delivery service, then a user update may be desired to establish user profile parameters identifying the content and/or services that may be delivered to the user, and their corresponding conditions. As another example, a user who is already registered may need to update his/her registration information when the user obtains a new computer, tablet, or other device, or if the user wishes to identify a different device for receipt of the primary and/or interactive content, or change the conditions of service.

If a user update is desired, then in step 405, the user's configuration information may be updated (or created, in the case of a new user). The configuration information may include a database storing information identifying the user, the user's payment parameters (if applicable), the services and content accessible to the user, and various conditions under which interactive features are to be offered to the user. A user may update the configuration for his/her account, for example, by logging in to a web page for a service provider. In doing so, the user may adjust various personal preference parameters surrounding the user's access to interactive content that is associated with a main content being consumed. Examples of these parameters are discussed below.

As one example, the user may identify a preferred device for receiving interactive content, or for providing responses to interactive content. For example, the user may specify one or more devices (e.g., the user's tablet, smartphone, personal computer, DVR, etc.) on which the user wishes to receive interactive content. The individual devices may be registered with the service provider as part of the user registration process.

The identification of preferred device may also depend on which device is being used to present the main content. For example, the user may indicate that when main content is being displayed on "Television 1" (identified using any suitable identification, such as name, device identifier, MAC—Media Access Control address, etc.), the user wishes to receive interactive content (associated with the main content) on the user's DVR that is supplying the television with the main content, and/or on the user's tablet computer. The user may also indicate that when the main content is being displayed on the user's tablet computer, then the associated interactive content should be delivered to the user's tablet as well, to be displayed alongside the main content, and that the DVR need not receive the interactive content.

The personal preferences can also identify the user's device's interactive capabilities, and whether those capabilities are accessible for interactive content. For example, the user's smart phone may include a front-facing camera, rear-facing camera, global positioning system (GPS), a compass and an accelerometer, and the stored preference information may identify these capabilities, as well as any indication as to whether the user wishes to permit their use for interactive features (e.g., a user may wish to not use any interactive features that require an accelerometer, or that would use a camera on their tablet or smart phone).

The personal preferences can also identify the types of main content for which the user does, or does not, wish to engage in interactive content. For example, if the user enjoys participating in game shows, then the user's profile may indicate that the user wishes to receive that form of interactive content. If the user does not wish to participate in news program polling, then the user's profile may also indicate that distaste of the user.

As noted above, the user configuration update may be initiated by a user accessing a service provider web page. In some embodiments, the user profile may also be updated by the service provider. Many of the same parameters discussed above can be tracked by the service provider as well, and stored in a service provider database at the computing device 107. For example, the service provider may store information identifying the user, and identifying the number of times and/or frequency with which the user engages with interactive content.

The service provider may store information identifying the device(s) that the user uses to engage with interactive content, and which devices are most favored by the user. For example, the service provider may note that a user uses his/her tablet to respond to thirty (30) interactive offerings per week, and uses his/her DVR to respond to fifty (50) interactive offerings per week, and that the user never uses his/her personal computer or smart phone to engage with interactive features.

The service provider may track the types of interactive content, and corresponding main content, that the user favors. For example, the service provider may track a percentage of interactive offerings to which the user responds, and the characteristics of those offerings. The service provider computing device may determine that the user responds to 75% of interactive offerings that are related to automobile advertisements, and only 10% of the interactive offerings that are related to home cleansers.

The service provider computing device may determine that, of the interactive features that the user used, the user used his/her DVR controller 90% of the time, used his/her tablet computer 10% of the time, and never used his/her smart phone.

The service provider computing device may also monitor the user's device features that were used for interactive responses. For example, the computing device may note that the user consistently responded to interactive features that relied on a tablet computer's accelerometer, and that the user occasionally (e.g., 50% of the time) took advantage of the table computer's GPS capabilities when using interactive content, but that the user never used an available front-facing camera on the tablet device.

The service provider computing device may also monitor the types of interactive features that the user tended to enjoy. For example, the FIGS. 3a-c examples showed various features. If the user regularly (e.g., 80% of the time offered) selected the 'OK' button to receive more information, but rarely (e.g., 0.05% of the time offered) selected directional buttons to change color of the object, then the computing device may store information indicating this history. Types of interactive features may include game playing, manipulation of 3-D objects, changing of color and/or appearance of graphical objects, features that require initiation of additional data streams of content, and any other desired form of interaction.

The various configuration preferences and tracked information discussed above can be combined as well. For example, the user may indicate a preference using a combination of the device capability preference and main content device preference (e.g., when main content is viewed on a display connected to the user's DVR, use the user's tablet computer for interactive features, but do not use the tablet's accelerometer—however, if the main content is viewed on the tablet, then use the tablet for interactive features, and enable the accelerometer).

In step 406, the computing device may determine whether it is time to deliver an interactive advertisement to a user. To make this determination, the computing device may first be provided with information identifying content that the user (and various other users) is watching, and the playback time of the user's consumption of the content. For example, the computing device may note the time when the user began watching the a program on demand, and may retrieve a schedule of when interactive segments (such as, but not limited to, advertisements) are to appear in the program (or during a commercial break in the program), and by comparing the current time with the schedule, the computing device may determine when it is time to deliver an advertisement to the user.

This determination may also be simpler, if the user is consuming a scheduled multicast content that is being transmitted according to a predetermined schedule (as opposed to on demand). For example, a linear broadcast of a nightly news program may begin at 6 pm on weeknights, with predetermined commercial breaks at 6:08, 6:12 and 6:18. The computing device may obtain, from the user's consumption device (e.g., a DVR, tablet computer, smart phone, etc.) an identification of the scheduled program that the user is viewing, and may retrieve information identifying the predetermined commercial break schedule for the program, to determine when it is time to deliver an advertisement to the user.

If it is time, then in step 407, the computing device may obtain the user's profile in step 407 by retrieving the one or more data files containing the user's information. As discussed above, the user's profile may identify a wide range of interactivity preferences of the user, and the interactivity feature usage history of the user.

In step 408, the computing device may obtain the network status. The network status may indicate, for example, the amount of current network usage being made by the user, or by all users served by the computing device, and the amount of available resources (e.g., bandwidth, processing capacity at the interactive feature application server 107, etc.).

In step 409, the computing device may determine the appropriate advertisement interactivity level for the user, based on the user profile information and the network status information, and on the overall available number of levels provided by the content source (e.g., the producer of the advertisement). By selecting the interactivity level, the computing device may avoid the transmission of software instructions and data for interactive features that the user is not likely to use, or that the user does not wish to receive, thereby conserving that amount of bandwidth. Note that in doing so, the user's consumption and/or second device may be fully capable of supporting the interactive features (e.g., the user's device may have all the resources needed to process and display the interactive features), but the decision to send a lower level of interactivity, and omit certain interactive features, may result in sending the user a version of the content that omits features that the user's device is able to support. On a larger scale, the computing device may service a wide range of users, all of whom may have devices that are able to handle interactive features, but rather than consume the bandwidth to transmit these features to all of the users' devices, the computing device may selectively transmit the interactive features to just the users who are more likely to actually use the interactive features. In some embodiments, a user who originally did not receive interactive features may request to have those features delivered to him/her via an upstream command. The user may also change his/her interactivity settings to allow selected levels of interactivity for different programs and/or services, and can also reset his/her settings to allow the system to reset the user's history information and start anew with tracking the user's behavior patterns.

In step 410, the computing device may retrieve the software and data needed to support the selected ad interactivity level, and generate one or more data transmission streams to provide the resources for the interactive features. As noted above, the additional transmission stream may be an MPEG ES accompanying an MPEG stream that carries the main video 300. In such an embodiment, the user's MPEG decoder (e.g., within the consumption device being used to consume the main content) may decode the MPEG ES and provide the contents to the device (e.g., the same consumption device, or a different one) that will provide the user with the interactive feature, and those contents, when executed by the receiving device, may result in providing the interactive experience to the user. If, from step 409, it was determined that no interactive features are to be provided to the user for the current advertisement, then in step 410, the ad may simply be transmitted in a basic form, without interactive features.

In step 411, the computing device may receive information from the user's consumption device (e.g., DVR 113) and/or the user's secondary device (e.g., tablet 303), indicating a degree with which the user is engaging in the interactive features. This may include providing user input responses that the user has entered in to the devices (e.g., button keypresses, menu options chosen, motion detected via accelerometer, etc.). Alternatively, this information may indicate that the user declined to engage in any of the interactive features that were transmitted and offered, or otherwise made available, to the user.

In step 412, the computing device may update the user's profile, adding information identifying the interactive features that were transmitted to the user, and the level of responsive interaction made by the user. The stored information may also indicate whether the user has concluded using the interactive features. This information may be useful for avoiding inundating the user with interactive options before the user is ready for them. For example, if two commercials are transmitted sequentially, each with an interactive feature, the user may choose to interact with the first one. If, by the time the first commercial ends and the second commercial begins, the user is still engaged with the interactive feature related to the first commercial, then in step 406 (for the second commercial), the computing device may determine that the interactive portion of the ad should not be delivered to the user, because the user is already engaged in an interactive session for the first commercial.

In step 413, the computing device may determine whether the user's interactivity requires further response. For example, if the user selected to initiate a chat session to ask about an advertised automobile, then the computing device 413 may take steps necessary for establishing the requested chat session with the automobile provider. The appropriate response will depend on the type of interactive feature that was offered, and the software instructions and/or data needed for the response may be established when the advertisement's interactivity levels were prepared in step 403.

In some embodiments, the response may involve a reward for the user. An advertiser may run a promotion with prizes, and if the user's response satisfies the advertiser's conditions (e.g., scoring a certain number of points in an interactive game), then the user may be granted the corresponding reward.

If a response is needed, then in step 414, the computing device may retrieve the associated software instructions for the advertisement's response, and execute them to provide the response.

Figure 5:
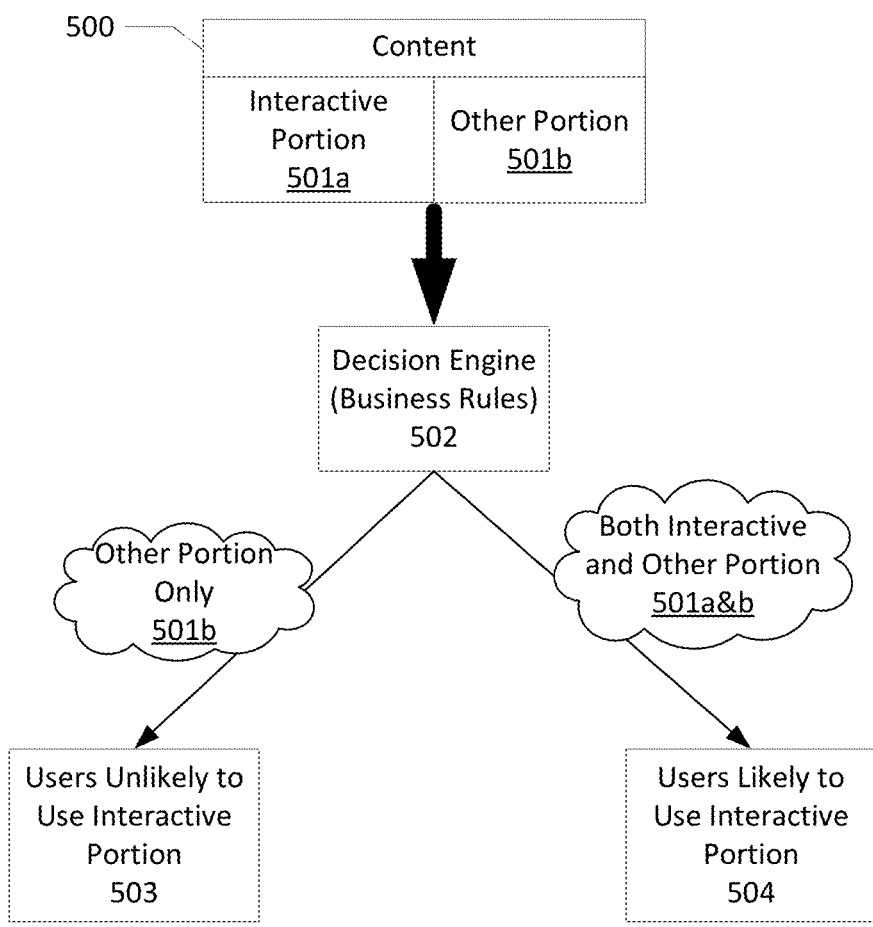
FIG. 5 illustrates an example process for determining whether an interactive portion of content is received by a user.

As a result of the FIG. 4 process, a user who is likely to use interactive content may receive the content with its interactive portion, while a user who is not likely to user interactive content may receive just the non-interactive portion of the content (e.g., an audiovisual portion) without the interactive portion (e.g., information that supports viewing alternative images of a product being advertised). FIG. 5 illustrates this conceptually. The content 500 may include both an interactive portion 501a (e.g., a script that allows the user to view different images of an advertised product) and a non-interactive other portion 501b (e.g., audio and video for a 30-second commercial, with no interactivity). This content may be processed by a computing device executing a decision engine or business rules 502 to determine which users are likely to use interactive content. Users who are unlikely to use the interactive portion may receive the other portion 501b of the content without the interactive portion 501a, while users who are likely to use the interactive portion 504 receive both the interactive portion 501a and the other portion 501b.

Although example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

We claim:
1. A method comprising:
  determining, by a computing device, a level of user interaction with interactive features associated with a plurality of first media assets outputted via a user device associated with a user;
  comparing the level of user interaction with the interactive features to an interactivity threshold;
  determining, from a non-interactive version of a second media asset and an interactive version of the second media asset and based on comparing the level of user interaction with the interactive features to the interac- tivity threshold, a determined version of the second media asset to send to the user device; and sending, to the user device, the determined version of the second media asset.

2. The method of claim 1, wherein the determining the level of user interaction with the interactive features comprises determining user device features used by the user to interact with a first media asset of the plurality of first media assets.

3. The method of claim 1, wherein the determining the level of user interaction with the interactive features comprises determining that the user requested an interactive portion of a first media asset of the plurality of first media assets to be outputted by a second user device associated with the user.

4. The method of claim 1, further comprising determining the determined version of the second media asset based on a profile of the user indicating a preference for engaging with interactive features for media assets of a type corresponding to the second media asset.

5. A method comprising:
  determining, by a computing device, a level of user interaction with interactive features associated with a plurality of first media assets outputted via a user device associated with a user;
  determining, from a first interactivity format for a second media asset and a second interactivity format for the second media asset, and based on comparing the level of user interaction with the interactive features to an interactivity threshold, a determined interactivity format for the second media asset; and
  sending, to the user device, a version of the second media asset, wherein the version of the second media asset corresponds to the determined interactivity format for the second media asset.

6. The method of claim 5, wherein the determining the level of user interaction with the interactive features comprises determining an interactivity format for a first media asset of the plurality of first media assets.

7. The method of claim 5, wherein the determined interactivity format for the second media asset corresponds to no interactive features.

8. The method of claim 5, wherein the determined interactivity format for the second media asset corresponds to an interactive button feature.

9. The method of claim 8, wherein the determined interactivity format for the second media asset corresponds to navigation controls.

10. The method of claim 9, wherein the determined interactivity format for the second media asset corresponds to a chat feature, to be outputted by a second user device associated with the user, for initiating a chat session with a sales representative.

11. An apparatus comprising:
  one or more processors; and
  memory storing instructions that, when executed by the one or more processors, cause the apparatus to:
    determine a level of user interaction with interactive features associated with a plurality of first media assets outputted via a user device associated with a user;
    compare the level of user interaction with the interactive features to an interactivity threshold;
    determine, from a non-interactive version of a second media asset and an interactive version of the second media asset and based on comparing the level of user interaction with the interactive features to the interactivity threshold, a determined version of the second media asset to send to the user device; and
    send, to the user device, the determined version of the second media asset.

12. The apparatus of claim 11, wherein the instructions, when executed by the one or more processors, cause the apparatus to determine user device features used to interact with a first media asset of the plurality of first media assets.

13. The apparatus of claim 11, wherein the plurality of first media assets and the second media asset comprise a same genre.

14. The apparatus of claim 11, wherein the non-interactive version of the second media asset comprises a consumable asset having no interactive features.

15. The apparatus of claim 11, wherein the interactive version of the second media asset comprises a consumable asset having one or more interactive features.

16. The apparatus of claim 15, wherein the one or more interactive features comprise one or more of a button, navigation controls, or chat.

17. An apparatus comprising:
  one or more processors; and
  memory storing instructions that, when executed by the one or more processors, cause the apparatus to:
    determine a level of user interaction with interactive features associated with a plurality of first media assets outputted via a user device associated with a user;
    determine a first interactivity format for a second media asset and a second interactivity format for the second media asset;
    determine, from the first interactivity format for the second media asset and the second interactivity format for the second media asset, and based on comparing the level of user interaction with the interactive features to an interactivity threshold, a determined interactivity format for the second media asset; and
    send, to the user device, a version of the second media asset, wherein the version of the second media asset corresponds to the determined interactivity format.

18. The apparatus of claim 17, wherein the plurality of first media assets and the second media asset comprise a same genre.

19. The apparatus of claim 17, wherein the determined interactivity format for the second media asset corresponds to no interactive features.

20. The apparatus of claim 17, wherein the determined interactivity format for the second media asset corresponds to one or more interactive features.

21. The apparatus of claim 20, wherein the one or more interactive features are provided to a second user device associated with the user.

22. The method of claim 1, wherein the determining the determined version of the second media asset is based on information indicating different interactivity thresholds for different versions of the second media asset.

23. The method of claim 1, wherein the determining the level of user interaction with the interactive features comprises determining, by the computing device, a frequency of use of an accelerometer of the user device.

24. The method of claim 1, wherein the determining the level of user interaction with the interactive features comprises determining, by the computing device, a frequency of use of global positioning system (GPS) capabilities of the user device.

25. The method of claim 1, wherein the determining the level of user interaction with the interactive features comprises determining, by the computing device, a frequency of use of a camera of the user device.

26. The method of claim 1, wherein determining the determined version of the second media asset further comprises determining a first interactive version of the second media asset comprising a first level of interactivity and determining a second interactive version of the second media asset comprising a second level of interactivity.

27. The method of claim 1, wherein the determining the determined version of the second media asset further comprises:
   determining a bandwidth of a network used to send an interactive version of a first media asset of the plurality of first media assets to the user device; and
   determining, based on the bandwidth satisfying a bandwidth threshold, the determined version to comprise the interactive version of the second media asset.

28. The method of claim 1, further comprising:
   increasing the interactivity threshold based on a bandwidth of a network, used to send an interactive version of a first media asset of the plurality of first media assets to the user device, not exceeding a bandwidth threshold.

29. The method of claim 1, further comprising:
   decreasing the interactivity threshold based on a bandwidth of a network, used to send an interactive version of a first media asset of the plurality of first media assets to the user device, exceeding a bandwidth threshold.

30. The method of claim 1, further comprising:
   sending the non-interactive version of the second media asset based on determining that the user did not interact with interactive features of a prior media asset of the plurality of first media assets.

31. The method of claim 1, further comprising:
   determining that the user device is capable of presenting interactive features of the second media asset; and
   determining the determined version of the second media asset to comprise the non-interactive version of the second media asset.

32. The method of claim 1, further comprising determining the determined version of the second media asset based on a profile of the user indicating permission to access one or more interactive capabilities of the user device.

\* \* \* \* \*

UNITED STATES PATENT AND TRADEMARK OFFICE
CERTIFICATE OF CORRECTION

PATENT NO. : 11,665,394 B2
APPLICATION NO. : 15/170437
DATED : May 30, 2023
INVENTOR(S) : Ariantaj et al.

It is certified that error appears in the above-identified patent and that said Letters Patent is hereby corrected as shown below:

In the Specification

Column 8, Detailed Description, Line 26:
Delete "device" and insert --devices-- therefor Column 8, Detailed Description, Line 31:
Delete "advertising" and insert --application-- therefor Column 8, Detailed Description, Line 52:
Delete "advertising" and insert --application-- therefor Column 8, Detailed Description, Line 56:
Delete "advertising" and insert --application-- therefor Column 14, Detailed Description, Line 5:
Delete "413" and insert --107-- therefor Signed and Sealed this
Thirtieth Day of July, 2024

Katherine Kelly Vidal
*Director of the United States Patent and Trademark Office*